March 3, 1964

JAMES E. WEBB
ADMINISTRATOR OF THE NATIONAL
AERONAUTICS AND SPACE
ADMINISTRATION
EXPULSION BLADDER-EQUIPPED STORAGE TANK STRUCTURE 3,123,248

Filed Oct. 4, 1962

INVENTOR.
EDGAR F. KOCH
BY
ATTORNEYS

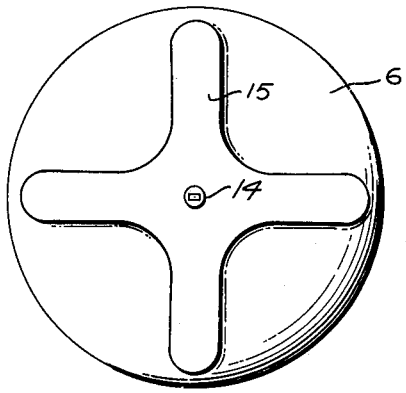
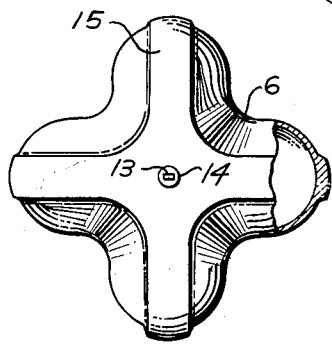
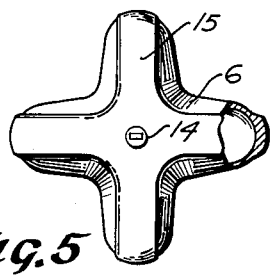
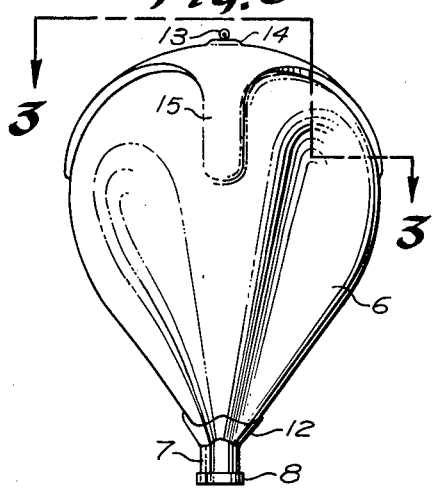
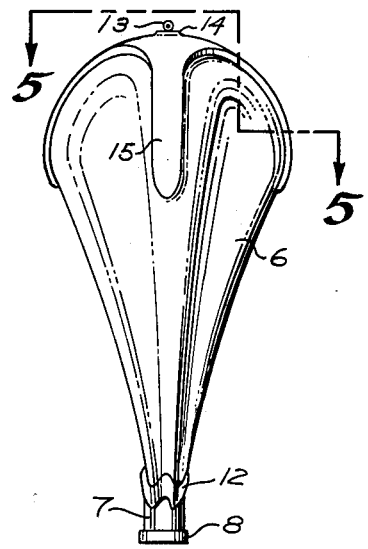

United States Patent Office 3,123,248
Patented Mar. 3, 1964

3,123,248
EXPULSION BLADDER-EQUIPPED STORAGE
TANK STRUCTURE
James E. Webb, Administrator of the National Aeronautics and Space Administration, with respect to an invention of Edgar F. Koch
Filed Oct. 4, 1962, Ser. No. 228,507
6 Claims. (Cl. 220—63)

This invention relates to expulsion, bladder-equipped, storage tank structures, and included in the objects of this invention are:

First, to provide an expulsion, bladder-equipped, storage tank structure so arranged that the bladder collapses in a predetermined pattern as its contents are depleted, or, conversely, expands in a complementary pattern as the bladder is filled; the pattern of collapse or expansion being such that three-corner folding or other creasing of the bladder, which would introduce localized stresses in the walls of the bladder and consequent wear or rupture of the bladder, is avoided.

Second, to provide an expulsion, bladder-equipped, storage tank structure wherein mass movement of the contents of the bladder is minimized.

Third, to provide an expulsion, bladder-equipped, storage tank structure wherein a normally spherical bladder is provided with a yieldable support diametrically opposite its outlet, and is contained in a tank having a dimension along the axis of the bladder between the outlet and yieldable support, which is at least equal to the extended length of the bladder, when its contents are depleted, so that the bladder folds radially inwardly, but it not forced to fold longitudinally.

With the above and other objects in view, as may appear hereinafter, reference is directed to the accompanying drawings in which:

FIGURE 2 is a reduced top view of the bladder in its fully filled condition;

FIGURE 3 is a partial top view, partial sectional view taken through 3—3 of FIGURE 4, showing the bladder in its initial stages of collapse as its contents are discharged;

FIGURE 4 is a side view of the bladder in its condition corresponding to FIGURE 3;

FIGURE 5 is a partial plan view, partial sectional view taken through 5—5 of FIGURE 6, showing the bladder as it approaches its final stage of collapse;

FIGURE 6 is a side view corresponding to FIGURE 5.

Figure 1:
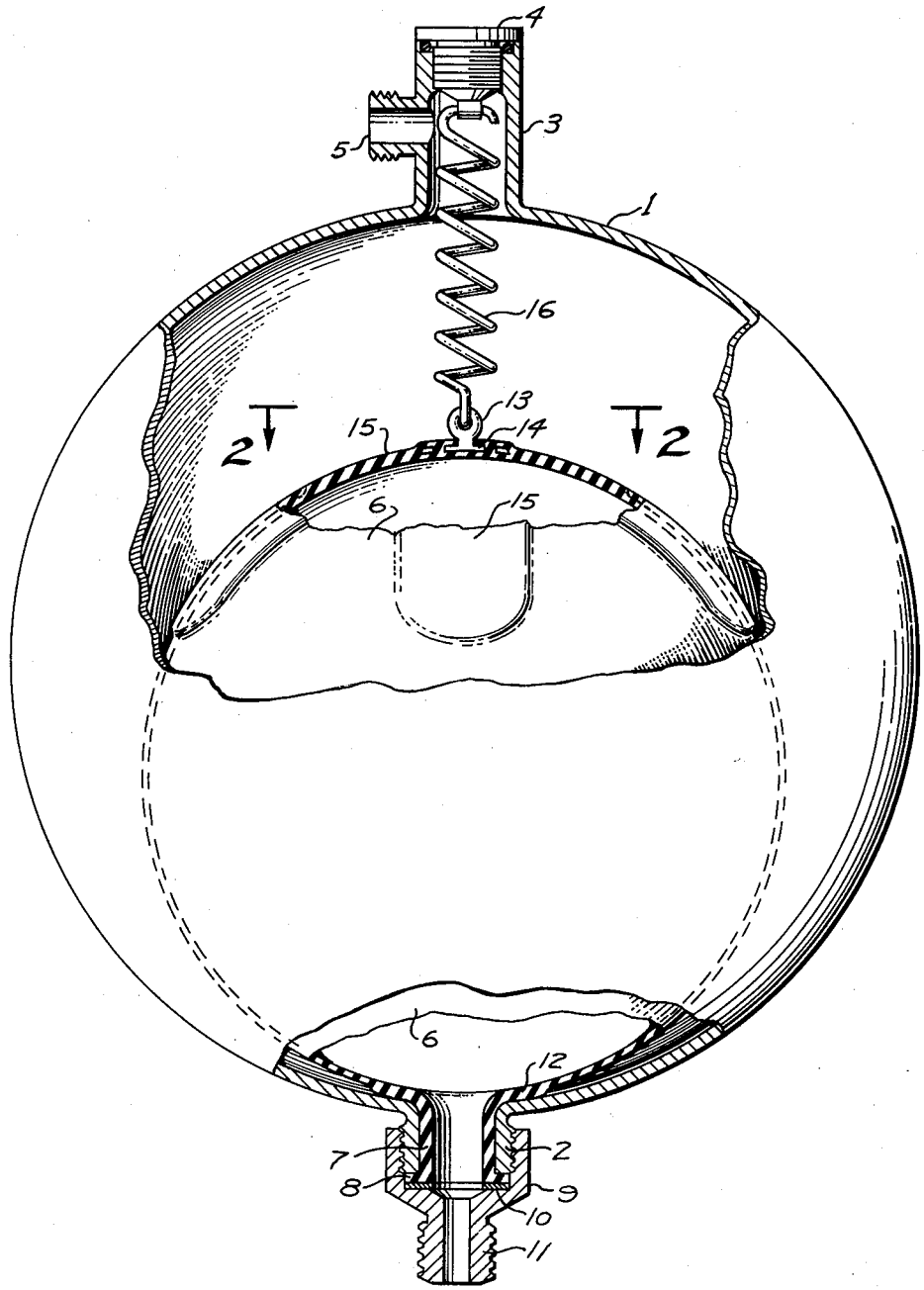
FIGURE 1 is a side view of the expulsion, bladder-equipped, storage tank structure with portions broken away and in section to illustrate the internal construction, and showing the bladder in its fluid-filled condition.

The expulsion, bladder-equipped, storage tank structure includes a storage tank shell 1, which is illustrated as spherical but may be cylindrical. At one end the storage tank is provided with a nipple 2 which is externally screw-threaded, and diametrically opposite therefrom the shell 1 is provided with a spring-receiving tube 3 closed by a seal plug 4. A lateral inlet 5 communicates with the tube 3.

The storage tank shell 1 receives a bladder 6 molded of rubber or other elastomer. Alternatively, the bladder 6 may be molded of material which is flexible, but which is relatively nonstretchable.

The bladder 6 is equipped with a nipple 7 which extends through the nipple 2 and forms both the inlet and outlet to the bladder 6. The extremity of the nipple 7 is provided with a flange 8 which fits over the extremity of the nipple 2.

A fitting 9 having an enlarged end, which is internally screw-threaded to receive the nipple 2, fits over the nipple for sealing engagement with the flange 8 through a washer 10. Beyond the washer 10, the fitting 9 forms a reduced portion 11 which is externally screw-threaded, and which is provided with an internal bore for connection to a flow line, not shown.

The zone of the bladder 6, surrounding the nipple 7, is preferably thickened to form a reinforcement 12.

Diametrically disposed or distal from the nipple 7 the bladder 6 is equipped with an eyelet 13 having a base 14 which is molded into the wall of the bladder 6. The zone surrounding the base 14 of the eyelet 13 is provided with reinforcing ribs 15, radiating from the base 14, so as to form circumferentially within this zone alternate regions of greater and lesser flexibility. The ribs 15 may extend approximately a third of the surface distance of the bladder 6 from the eyelet 13 to the nipple 7.

A tension spring 16 is attached by one end to the eyelet 13 and by its other end to the seal plug 4, so as to exert a force tending to elongate the bladder 6 in the direction of the axis between the nipple 7 and the eyelet 13.

The dimension of the shell 1 between its nipple 2 and tube 3 is approximately equal to one-half the circumference of the bladder 6 in the plane of the eyelet 13 and nipple 7.

Operation of the expulsion, bladder-equipped, storage tank structure is as follows:

When the bladder 6 is filled with a fluid, for example, a liquid propellant, it tends to assume the spherical shape shown in FIGURE 1. The bladder 6 will also assume this shape if filled with a gaseous fluid at a pressure greater than the pressure in the region between the bladder 6 and the shell 1.

As the contents of the bladder 6 are discharged, for example, by the application of fluid pressure to the region between the bladder 6 and the tank, the walls of the bladder between the eyelet 13 and the nipple 7 corrugate inwardly, as shown in FIGURES 3 through 6. The corrugations become more pronounced as the contents are discharged, and at the same time the bladder 6 elongates along the axis between the eyelet 13 and nipple 7 due to the tension exerted by the spring 16.

In the structure shown, four reinforcing ribs 15 are illustrated so that the bladder 6, when collapsed, assumes an essentially cross shape. It should be understood, however, that, depending upon the size of the bladder, a greater or lesser number of reinforcing ribs 15 may be provided.

It will be observed that the reinforcing ribs 15 provide regions of decreased flexibility so that the portions between these ribs have a greater tendency to collapse. Once the corrugations are formed, the collapsing of the bladder 6 continues uniformly without producing creases or other areas of concentrated stress.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:
1. A storage tank structure, comprising:
 (a) a rigid storage tank shell having an outlet opening and an inlet opening;
 (b) a flexible storage bladder adapted to be filled with a fluid and having an outlet means secured in the outlet opening of said shell;
 (c) tension means attached to said bladder and to said shell at locations diametrically opposite from said outlet means and exerting a force in a direction to elongate said bladder;

(d) and reinforcing for said bladder radiating from the attachment location of said tension means thereto, for causing said bladder to corrugate in planes transverse to the axis between said outlet means and said attachment locations as the contents of said bladder are depleted.

2. A storage tank structure, comprising:
(a) a flexible storage bladder having an opening for ingress and egress of fluid;
(b) means for securing said bladder in the region of said opening;
(c) tension means secured to said bladder at a location distal from said opening for elongating said bladder along an axis therebetween, said bladder being constructed to assume, when filled, a circular shape in planes transverse to said axis;
(d) and reinforcing means for said bladder radiating from said location, and causing said bladder to corrugate in said planes as the contents of said bladder are depleted.

3. A storage tank structure, comprising:
(a) a flexible storage bladder having an opening for ingress and egress of fluid;
(b) a shell surrounding said bladder and attached to said bladder adjacent said opening, said shell extending beyond the end of said bladder distal from said opening;
(c) a tension spring secured to said distal end of said bladder and to the shell beyond said distal end, said spring tending to elongate said bladder;
(d) and means integral with said bladder, tending to corrugate the side walls of said bladder as the bladder is elongated.

4. A storage tank structure, comprising:
(a) a flexible storage bladder having an opening for ingress and egress of fluid;
(b) a shell surrounding said bladder and attached to said bladder adjacent said opening, said shell extending beyond the end of said bladder distal from said opening;
(c) a tension spring secured to said distal end of said bladder and to the shell beyond said distal end, said spring tending to elongate said bladder;
(d) said bladder being symmetrical with respect to an axis extending between said opening and distal end;
(e) and flexible reinforcing ribs radiating from the region of attachment of said spring whereby, peripherally, said bladder has alternately regions of greater and lesser flexibility to cause said bladder to become peripherally corrugated as its contents are discharged.

5. A storage tank structure, comprising:
(a) a flexible storage bladder having an opening for ingress and egress of fluid;
(b) a shell surrounding said bladder and attached to said bladder adjacent said opening, said shell extending beyond the end of said bladder distal from said opening;
(c) said bladder being symmetrical with respect to an axis extending between said opening and distal end;
(d) said bladder having a zone surrounding said distal end circumferentially divided into segments of greater and lesser flexibility, to cause said bladder to become circumferentially corrugated as said bladder is axially extended and its contents are discharged;
(e) and means for axially extending said bladder.

6. A storage tank structure, comprising:
(a) a flexible storage bladder having an opening for ingress and egress of fluid;
(b) said bladder having an end distal from said opening defining therewith an axis about which said bladder is symmetrically disposed;
(c) said bladder having a zone surrounding said distal end circumferentially divided into segments of greater and lesser flexibility, to cause said bladder to become circumferentially corrugated as said bladder is axially extended and its contents are discharged;
(d) and means for axially extending said bladder.

References Cited in the file of this patent
UNITED STATES PATENTS

| | | |
|---|---|---|
| 2,394,853 | Goddard | Feb. 12, 1946 |
| 2,721,580 | Greer | Oct. 25, 1955 |

FOREIGN PATENTS

| | | |
|---|---|---|
| 1,161,905 | France | Mar. 31, 1958 |